United States Patent
Sip

(10) Patent No.: US 9,170,623 B2
(45) Date of Patent: Oct. 27, 2015

(54) ELECTRONIC SYSTEMS AND POWER MANAGEMENT METHODS THEREOF

(75) Inventor: Kim Yeung Sip, Taipei Hsien (TW)

(73) Assignee: ACER INCORPORATED, Taipei Hsien (TW)

(*) Notice: Subject to any disclaimer, the term of this patent is extended or adjusted under 35 U.S.C. 154(b) by 517 days.

(21) Appl. No.: 13/603,292

(22) Filed: Sep. 4, 2012

(65) Prior Publication Data

US 2013/0061067 A1    Mar. 7, 2013

(30) Foreign Application Priority Data

Sep. 5, 2011   (TW) .............................. 100131879 A

(51) Int. Cl.
*G06F 1/26* (2006.01)
*G06F 1/32* (2006.01)

(52) U.S. Cl.
CPC .............. *G06F 1/266* (2013.01); *G06F 1/3203* (2013.01)

(58) Field of Classification Search
CPC ......... G06F 1/26; G06F 1/266; G06F 1/3203; Y02B 60/1238; Y02B 60/1278
See application file for complete search history.

(56) References Cited

U.S. PATENT DOCUMENTS

| | | | |
|---|---|---|---|
| 6,064,554 A | 5/2000 | Kim | |
| 8,086,777 B2 | 12/2011 | Ma et al. | |
| 8,261,001 B2* | 9/2012 | Bobrek | 710/310 |
| 8,667,314 B2 | 3/2014 | Yen et al. | |
| 2006/0259792 A1 | 11/2006 | Dove | |
| 2009/0100275 A1 | 4/2009 | Chang et al. | |
| 2011/0167176 A1 | 7/2011 | Yew et al. | |
| 2013/0173940 A1* | 7/2013 | Sargent et al. | 713/310 |

FOREIGN PATENT DOCUMENTS

| | | |
|---|---|---|
| CN | 101441506 A | 5/2009 |
| CN | 201845275 | 5/2011 |
| EP | 1 659 478 | 5/2006 |
| TW | 201027877 | 7/2010 |
| TW | 201115355 | 5/2011 |

OTHER PUBLICATIONS

Taiwanese language office action dated Jul. 21, 2014.
English language translation of abstract of TW 201027877 (published Jul. 16, 2010).
English language translation of abstract of TW 201115355 (published May 1, 2011).
English language translation of abstract of CN 201845275 (published May 25, 2011).
Chinese language office action dated Oct. 10, 2014.
European Search Report dated Dec. 21, 2012.
CN Office Action dated Apr. 10, 2015 in corresponding Chinese application (No. 201110281230.6).

* cited by examiner

*Primary Examiner* — Thuan Du
(74) *Attorney, Agent, or Firm* — McClure, Qualey & Rodack, LLP

(57) ABSTRACT

An electronic device is provided, including an input output expander, at least one electronic device and a control module. The input output expander outputs a power source to a peripheral device by at least one output terminal The electronic device is coupled to the input output expander in a daisy chain configuration. The control module adjusts current powers of the electronic device and the peripheral device according to real time powers of the electronic device and the peripheral device, a maximum output power and parameters, thereby preventing power outputted by the input output expander from being larger than the maximum output power.

15 Claims, 4 Drawing Sheets

ELECTRONIC SYSTEMS AND POWER MANAGEMENT METHODS THEREOF

CROSS REFERENCE TO RELATED APPLICATIONS

This Application claims priority of Taiwan Patent Application No. 100131879, filed on Sep. 05, 2011, the entirety of which is incorporated by reference herein.

BACKGROUND OF THE INVENTION

1. Field of the Invention

The present invention relates to electronic systems, and in particular relates to electronic systems having thunderbolt interfaces.

2. Description of the Related Art

Recently, computers and networks have made many innovative functions more effective. New peripheral devices, such as internet units and external storage units, can easily be connected to computers or notebooks. However, the management of performance (power) and temperature of the peripheral devices is not effective. Thus, there is a need for an electronic system and a power management method thereof to increase the stability of hosts and peripheral devices and decrease the power consumption of the peripheral devices.

BRIEF SUMMARY OF THE INVENTION

In light of the previously described problems, the invention provides an electronic device, including an input output expander, at least one electronic device and a control module. The input output expander outputs a power source to a peripheral device by at least one output terminal The electronic device is coupled to the input output expander in a daisy chain configuration. The control module adjusts current powers of the electronic device and the peripheral device according to real time powers of the electronic device and the peripheral device, a maximum output power and parameters, thereby preventing power outputted by the input output expander from being larger than the maximum output power.

The invention also provides a power management method suitable for electronic devices connected in a daisy-chain configuration. The power management method includes the steps of: detecting real time powers of the electronic device and the peripheral device; and adjusting current powers of the electronic device and the peripheral device according to the real time powers of the electronic device and the peripheral device, a maximum output power and parameters, thereby preventing power outputted by the input output expander from being larger than the maximum output power.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
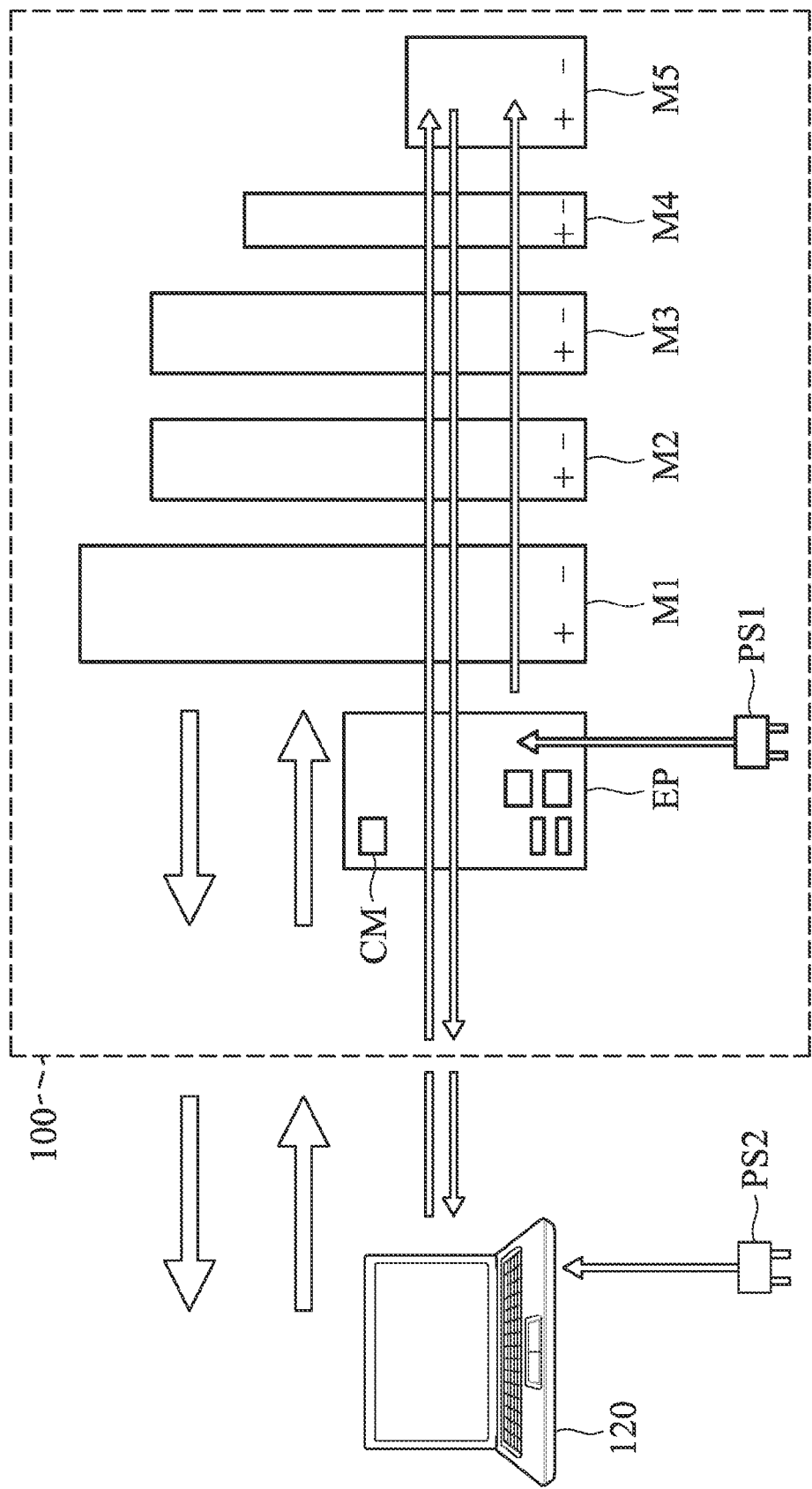
FIG.1 illustrates an embodiment of an electronic system for performing a power management process.

FIG.1 illustrates an embodiment of an electronic system for performing a power management process. As shown in FIG. 1, the electronic system 100 includes an input/output expander EP (I/O expander), devices M1~M5 and a control module CM. In the embodiment, the control module CM is disposed in the I/O expander EP. In some embodiments, the control module CM is disposed in one of the electronic devices M1~M5, or a host 120 coupled to the electronic system 100, but is not limited thereto. The electronic devices M1~M5 are overlapped in a direction from the I/O expander EP, and the electronic devices M1~M5 and the I/O expander EP have high speed transmission interfaces, e.g., a thunderbolt interface (or light peak interface), such that the electronic devices M1~M5 and the I/O expander EP use a transport protocol compatible with a thunderbolt interface to communicate with a host 120. The electronic devices M1~M5 are coupled in a daisy-chain configuration. Note that amounts and kinds of the electronic devices (e.g., electronic devices M1~M5) are not limited thereto. In the embodiments, the high speed transmission interfaces can be thunderbolt interfaces, but is not limited thereto. In other words, any electronic device having high speed transmission interfaces (e.g., more than 5 Gbps) can serve as the I/O expander EP or any of the electronic devices M1~M5. The I/O expander EP is powered by a power supply PS1, and the I/O expander EP outputs power provided by the power supply PS1 to the electronic devices M1~M5 or the peripheral devices. The host 120 is powered by an external power supply SP2 or a battery disposed in the host 120.

Figure 2:
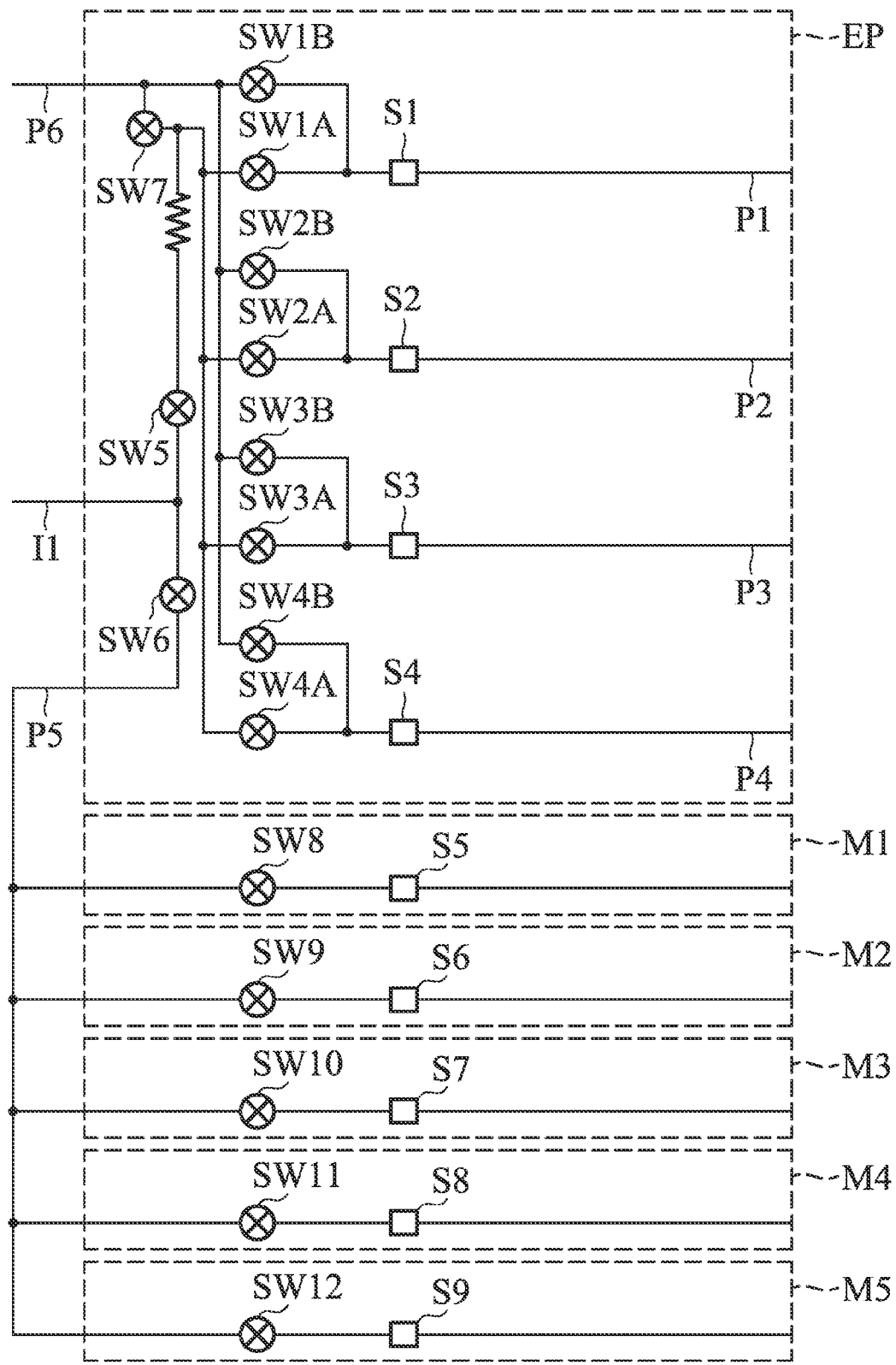
FIG.2 illustrates an embodiment of an electronic system for performing a power management process.

FIG. 2 illustrates an embodiment of an electronic system for performing a power management process. As shown in FIG. 2, the I/O expander EP has an input terminal I1 and output terminals P1~P5. In detail, the input terminal I1 is coupled to the power supply PS1 to receive power from the power supply PS1. The I/O expander EP provides power to the peripheral devices through the output terminals P1~P4, in which the peripheral devices have no thunderbolt interfaces. For example, the output terminals P1 and P2 are universal serial bus (USB) interfaces. The output terminal P3 is a high definition multimedia interface (HDMI). The output terminal P4 is an internet interface. Note that amounts and kinds of the output terminals are provided for illustration, but are not limited thereto. The switching units SW1A and SW1B can selectively enable the host 120 and/or the I/O expander to (or not to) provide power to the output terminal P1. Features of the switching units SW2A~SW4A and SW2B~SW4B are the same as the features of the switching units SW1A and SW1B, therefore, the details of the switching units SW2A~SW4A and SW2B~SW4B are omitted for brevity. The I/O expander EP provides power to the electronic devices M1~M5 through the output terminal P5. Each of the electronic devices M1~M5 has the corresponding input terminal for receiving power from the I/O expander EP.

The power detectors S1~S9 detect the real time powers of the peripheral devices and the electronic devices M1~M5. The switching unit SW5 can selectively provide (or stop providing) power to the I/O expander EP. The switching units SW6, SW8~SW12 can selectively provide (or stop providing) power to the electronic devices M1~M5. When a new electronic device is connected to the last sorted electronic device, the control module CM adjusts the current power of the electronic devices and the peripheral devices according to the real time power of the electronic devices (e.g., the electronic devices M1~M5) and the peripheral devices, the maximum output power and the parameters, to prevent the power outputted by the I/O expander EP from being larger than the maximum output power.

For example, assume that the maximum power provided to the I/O expander EP by the power supply PS1 is 100 Watt. Therefore, the maximum output power of the I/O expander EP approximates to the 100 Watt (hereinafter the maximum output power is 100 Watt). When the electronic device M5 is connected to the electronic device M4, the control module CM can detect the maximum power and the minimum power of the electronic device M5 and the kind of the electronic device M5, and adjust the current powers of the electronic devices M1~M4 according to the real time power of the electronic devices M1~M4 and the peripheral devices and the maximum output power (e.g., 100 Watt) and the parameters, to prevent power outputted by the I/O expander EP from being larger than the maximum output power (e.g., 100 Watt).

In the embodiment, the parameters include the priority order for stopping the provision of power to the electronic devices, utility rates of all of the electronic devices (e.g., electronic devices M1~M5) and the maximum powers and the minimum powers of all of the electronic devices (e.g., electronic devices M1~M5) and all of peripheral devices. The electronic system 100 selectively stops providing power or underclocks the electronic devices M1~M5 or the peripheral devices, to prevent power outputted by the I/O expander EP from being larger than the maximum output power.

For example, when the electronic device M5 is connected to the electronic device M4, the control module CM detects that the minimum power of the electronic device M5 is 10 Watt. Assume that the total current power of the electronic devices M1~M4 and the peripheral devices is 95 Watt. If the electronic device M5 joins the electronic system 100, the electronic devices M1~M4 or the peripheral devices will operate abnormally. The control module CM can stop providing power to the electronic device M1 according to the priority order (e.g., The control module CM has a priority to stop providing power to the electronic device M1), such that the electronic device M5 and other electronic devices operate normally.

In the embodiment, the control module CM can selectively turn off any electronic device according to the utility rates of the electronic devices M1~M4 and the peripheral device. For example, assume that the electronic device M2 always operates in a stand-by mode. When the electronic device M5 is connected to the electronic device M4, the control module CM stops providing power to the electronic device M2, such that the electronic devices M1, M3~M5 and the peripheral devices can operate normally.

In the embodiment, the control module CM can selectively stop providing power to any device according to the maximum powers or the minimum powers of the electronic devices M1~M4 and the peripheral devices. For example, assume that the electronic device M3 has the largest minimum power in the electronic devices M1~M4. The electronic system 100 will reduce a lot of power consumption if the control module CM stops providing power to the electronic device M3. Therefore, when the electronic device M5 is connected to the electronic device M4, the control module CM stops providing power to the electronic device M3, such that the electronic devices M1~M2 and M4~M5 and the peripheral devices can operate normally.

In some embodiments, when the electronic device M5 is connected to the electronic device M4, the control module CM can reduce performance of at least one of the electronic devices M1~M4. For example, the electronic devices M2, M3 and M4 can respectively be an optical disk drive, a hard disk driver (HDD) and a graphics card, in which the graphics card has a graphics processing unit (GPU) device. The control module CM can reduce the read speed of the electronic device M2 and/or the rotational speed of the electronic device M3 and/or the operating frequency of the electronic device M4 to reduce the power consumption of the electronic devices M2, M3 or M4, thereby allowing the electronic device M5 to operate normally.

In some embodiments, the control module determines which performances of graphics processing units of the host 120 and the electronic device M4 is the highest and decides to turn off that having the highest performance. In addition, the graphics processing units of the host 120 and the electronic device M4 can operate at the same time. For example, the graphics processing unit of the host 120 displays the odd frames and the graphics processing unit of the electronic device M4 displays the even frames, but is not limited thereto.

Figure 3:
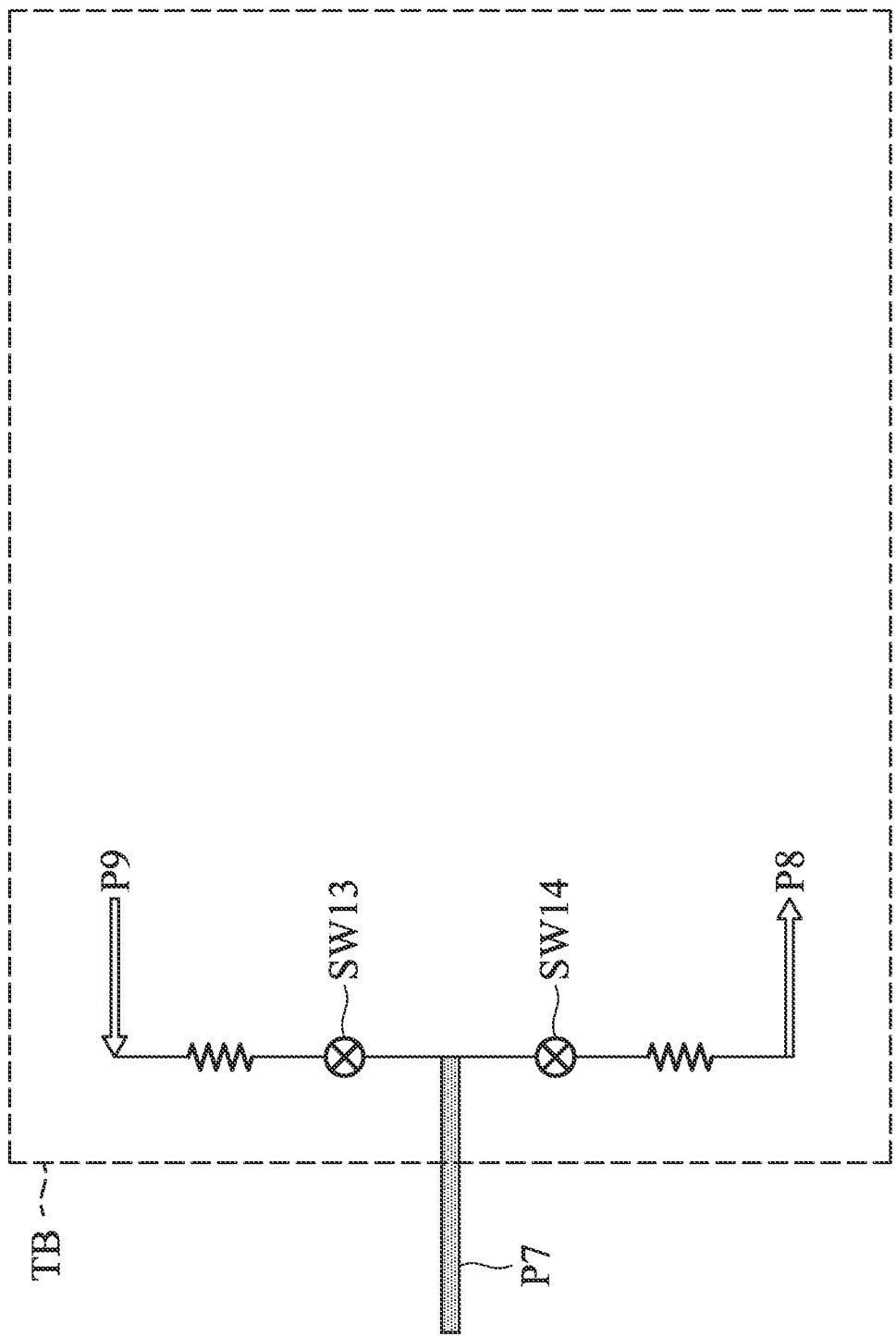
FIG. 3 illustrates an embodiment of the thunderbolt interface of the invention, in which the thunderbolt interface TB is disposed in the host 120.

FIG. 3 illustrates an embodiment of the thunderbolt interface of the invention, in which the thunderbolt interface TB is disposed in the host 120. As shown in FIG. 3, the output terminal P7 of the thunderbolt interface TB is coupled to the output terminal P6 of the I/O expander EP, and the output terminal P9 of the thunderbolt interface TB receives power from the host 120 to provide power to the electronic devices M1~M5, the peripheral devices and the I/O expander EP. In the embodiments, when the power supply PS1 provides power to the I/O expander EP, the thunderbolt interface TB stops providing power to the electronic devices M1~M5, the peripheral device and the I/O expander EP by the switching unit SW13. In some embodiments, when the power supply PS1 provides power to the I/O expander EP, the thunderbolt interface TB provides power to the electronic devices M1~M5 at the same time. For example, the power supply PS1 provides power (e.g., 100 Watt) to the I/O expander EP, and the thunderbolt interface TB provides power (e.g., 10 Watt) to the I/O expander EP. Therefore, the I/O expander EP can provide power (e.g., 110 Watt) to the electronic devices M1~M5 or the peripheral devices. Thus, the maximum output power of the I/O expander EP becomes 110 Watt. In some embodiments, when an external power supply PS2 is disabled, the I/O expander EP provides power (e.g., 10 Watt) to the host 120 by the switching unit SW14 of the thunderbolt interface TB and switching unit SW7, such that the output terminal P8 outputs power to the host 120, thereby allowing the battery of the host 120 to be charged.

In the embodiment, note that the host 120 may be other devices, including handheld devices, portable devices, personal digital assistant, multiprocessor-based, microprocessor-based or programmable consumer electronics, network PCs, minicomputers, mainframe computers, and the like, but is not limited thereto. The control module CM can be disposed in a single central-processing unit (CPU) or a parallel processing unit associated with a parallel processing environment to perform power management process.

Figure 4:
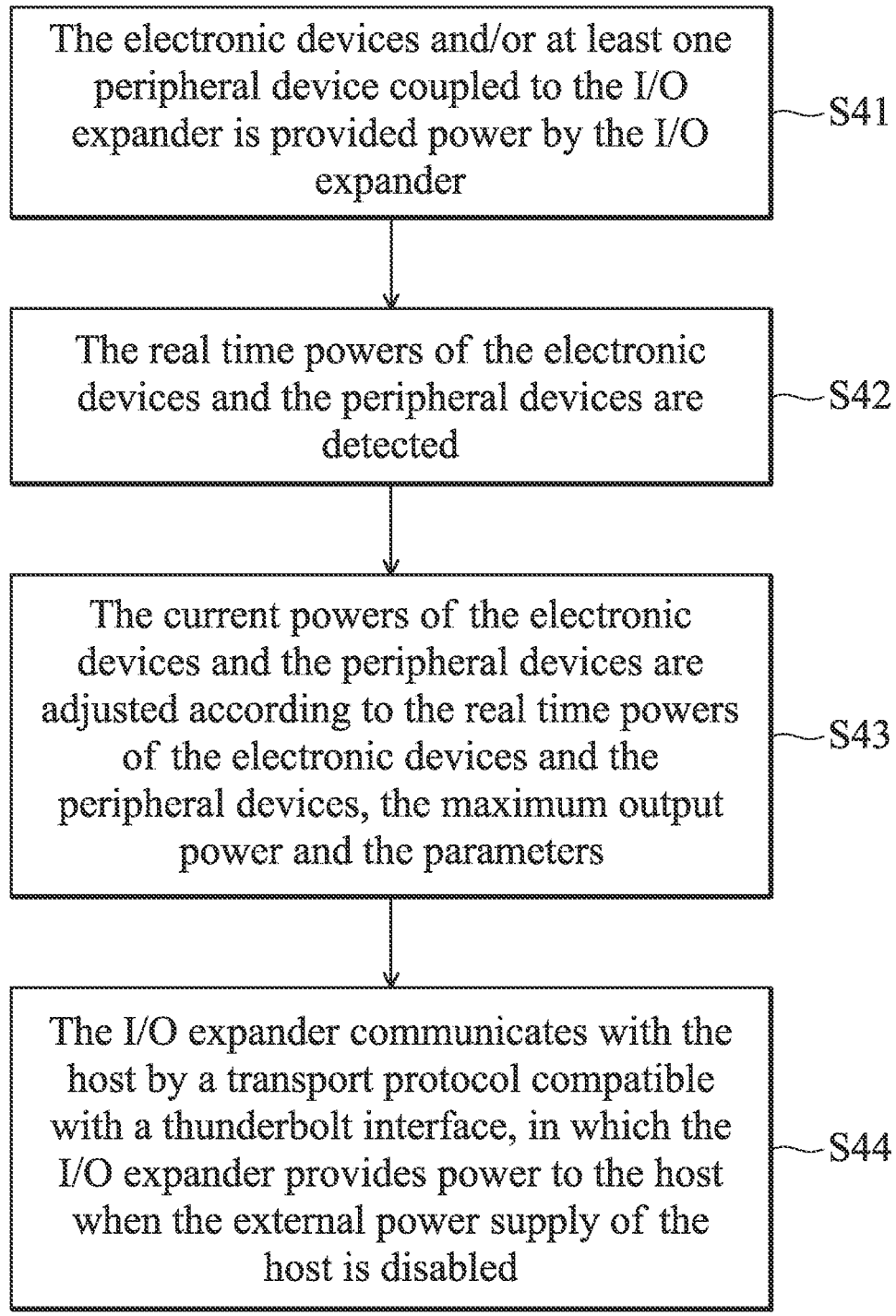
FIG. 4 illustrates a flowchart of the power management method of the invention suitable for an electronic system 100 having the I/O expander EP and at least one electronic device.

FIG. 4 illustrates a flowchart of the power management method of the invention suitable for an electronic system 100 having the I/O expander EP and at least one electronic device (e.g., the electronic devices M1~M5), in which the electronic devices M1~M5 are connected to the I/O expander EP in a daisy-chain configuration. As shown in FIG. 4, the power management method includes the following steps.

In step S41, the electronic devices M1~M5 and/or at least one peripheral device coupled to the I/O expander EP is provided power by the I/O expander EP. In step S42, the real time powers of the electronic devices M1~M5 and the peripheral devices are detected, in which the I/O expander EP uses a transport protocol compatible with a thunderbolt interface to communicate with the electronic devices M1~M5. In step S43, the current powers of the electronic devices M1~M5 and the peripheral devices are adjusted according to the real time powers of the electronic devices M1~M5 and the peripheral devices, the maximum output power and the parameters, to prevent the power outputted by the I/O expander EP from being larger than the maximum output power. In step S44, the I/O expander EP communicates with the host 120 by a transport protocol compatible with a thunderbolt interface, in which the I/O expander EP provides power to the host 120 when the external power supply PS2 of the host 120 is disabled.

In detail, the maximum output power is the maximum power outputted by the I/O expander EP. For example, when only the host 120 provides power (e.g., 10 Watt) to the I/O expander EP, the maximum output power of the I/O expander EP is 10 Watt. When only the power supply PS1 provides power (e.g., 100 Watt) to the I/O expander EP, the maximum output power of the I/O expander EP is 100 Watt. When the host 120 and the power supply PS1 both provide power to the I/O expander EP, the maximum output power of the I/O expander EP is 110 Watt. The magnitudes of powers (10 Watt and 100 Watt) outputted by the host 120 and the power supply PS1 are provided for illustration, but are not limited thereto.

The electronic system 100 and the power management method of the invention can adjust the current power of the electronic devices and the peripheral devices according to the real time power of the electronic devices and the peripheral devices, the maximum output power and the parameters, thereby preventing the power outputted by the I/O expander EP from being larger than the maximum output power when another electronic device is connected to the electronic system 100, in order to increase the stability of the electronic system.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An electronic system, comprising:
    an input output expander, outputting a power source to a peripheral device by at least one output terminal;
    at least one electronic device, coupled to the input output expander in a daisy chain configuration; and
    a control module, adjusting current powers of the electronic device and the peripheral device according to real time powers of the electronic device and the peripheral device, a maximum output power and parameters, thereby preventing power outputted by the input output expander from being larger than the maximum output power,
    wherein the parameters comprise utility rates of the electronic device and the peripheral device, such that the control module selectively stops providing power to or underclocks the electronic device or the peripheral device according to the utility rates, thereby preventing power outputted by the input output expander from being larger than the maximum output power.

2. The electronic system as claimed in claim 1, wherein the parameters comprise a priority order, such that the control module selectively stops providing power to or underclocks the electronic device or the peripheral device according to the priority order, thereby preventing power outputted by the input output expander from being larger than the maximum output power.

3. The electronic system as claimed in claim 1, wherein the parameters comprise maximum powers and minimum powers of the electronic device and the peripheral device, such that the control module selectively stops providing power to or underclocks the electronic device or the peripheral device according to the maximum powers and the minimum powers, thereby preventing power outputted by the input output expander from being larger than the maximum output power.

4. The electronic system as claimed in claim 1, wherein the input output expander communicates with a host by a transport protocol compatible with a thunderbolt interface and the input output expander provides power to the host when an external power supply of the host is disabled.

5. The electronic system as claimed in claim 1, wherein the control module is disposed in the electronic device, the input output expander or the host.

6. The electronic system as claimed in claim 1, wherein each of the input output expander and the electronic device includes at least one power detector to detect the real time powers.

7. The electronic system as claimed in claim 1, wherein the electronic device is overlapped in a direction from the input output expander and uses a transport protocol compatible with a thunderbolt interface to communicate with the host.

8. The electronic system as claimed in claim 1, wherein the control module further reduces a read speed, a rotational speed or an operating frequency of the electronic device or the peripheral device to reduce power consumption of the electronic device or the peripheral device.

9. A power management method, suitable for an electronic system having at least one electronic device and an input output expander connected in a daisy-chain configuration to the electronic device and coupled to at least one peripheral device, comprising:
    detecting real time powers of the electronic device and the peripheral device; and
    adjusting current powers of the electronic device and the peripheral device according to the real time powers of the electronic device and the peripheral device, a maximum output power and parameters, thereby preventing power outputted by the input output expander from being larger than the maximum output power,
    wherein the parameters comprise utility rates of the electronic device and the peripheral device, such that the electronic device selectively stops providing power to or underclocks the electronic device or the peripheral device according to the utility rates, thereby preventing power outputted by the input output expander from being larger than the maximum output power.

10. The power management method as claimed in claim 9, further comprising:
    providing power to the electronic device and/or the peripheral device by the input output expander.

11. The power management method as claimed in claim 9, further comprising:
    communicating between the input output expander and a host by a transport protocol compatible with a thunderbolt interface, wherein the input output expander provides power to the host when an external power supply of the host is disabled.

12. The power management method as claimed in claim 9, wherein the parameters comprise a priority order of the electronic devices, such that the control module selectively stops providing power to or underclocks the electronic device or the peripheral device according to the priority order, thereby preventing power outputted by the input output expander from being larger than the maximum output power.

13. The power management method as claimed in claim 9, wherein the parameters comprise the maximum powers and the minimum powers of the electronic device and the peripheral device, such that the control module selectively stops providing power to or underclocks the electronic device or the peripheral device according to the maximum powers and the minimum powers, thereby preventing power outputted by the input output expander from being larger than the maximum output power.

14. The power management method as claimed in claim 9, wherein the control module is disposed in the electronic device, the input output expander or the host and the electronic device uses a transport protocol compatible with a thunderbolt interface to communicate with the host.

15. The power management method as claimed in claim 9, further comprising:
   reducing a read speed, a rotational speed or an operating frequency of the electronic device or the peripheral device to reduce power consumption of the electronic device or the peripheral device.

* * * * *